United States Patent [19]

Hamelin et al.

[11] Patent Number: 4,825,139
[45] Date of Patent: Apr. 25, 1989

[54] ELECTRIC POWER SUPPLY UNIT, IN PARTICULAR FOR A MOTOR VEHICLE, AND AN ELECTRIC ROTARY MACHINE FOR SUCH A UNIT

[75] Inventors: Gilbert Hamelin, Marly La Ville; Lucien Palma, Paris, both of France

[73] Assignee: Valeo, Paris, France

[21] Appl. No.: 70,050

[22] Filed: Jul. 6, 1987

[30] Foreign Application Priority Data

Jul. 4, 1986 [FR] France .................. 86 09730

[51] Int. Cl.$^4$ ............ H02J 7/24; H02P 9/48
[52] U.S. Cl. .................. 322/90; 320/59; 320/61; 322/94
[58] Field of Search .......... 322/89, 90, 94, 28, 322/29; 320/59, 61, DIG. 2

[56] References Cited

U.S. PATENT DOCUMENTS

| 3,400,318 | 9/1968 | Hill | 320/41 |
| 3,982,169 | 9/1976 | Cummins | 322/28 |
| 4,100,474 | 7/1978 | Pfeffer et al. | 322/90 X |

FOREIGN PATENT DOCUMENTS

| 2013189 | 3/1971 | Fed. Rep. of Germany . |
| 2240486 | 2/1974 | Fed. Rep. of Germany . |
| 3432128 | 3/1985 | Fed. Rep. of Germany . |
| 1486382 | 6/1967 | France . |
| 2089190 | 1/1972 | France . |
| 2481852 | 11/1981 | France . |

*Primary Examiner*—R. J. Hickey
*Attorney, Agent, or Firm*—Cushman, Darby & Cushman

[57] ABSTRACT

The electric power supply comprises an electric rotary machine intended to be driven by an engine in order to supply electrical energy to a battery and/or to various user units, and rectifier means combined with the machine for obtaining direct current. The machine is chosen in such a way that when it is driven by the engine at its idling speed, the voltage at the terminals of the machine is insufficient to ensure charging of the battery; the unit comprises means to make it possible to establish periodically a voltage surge at the terminals of the machine and a current for charging the battery.

13 Claims, 6 Drawing Sheets

ELECTRIC POWER SUPPLY UNIT, IN PARTICULAR FOR A MOTOR VEHICLE, AND AN ELECTRIC ROTARY MACHINE FOR SUCH A UNIT

The invention relates to an electric power supply unit for a motor vehicle in particular. The unit is of the type comprising a rotary electric machine intended to be driven by an engine so as to supply electrical energy to a battery and/or various user units, and rectifying means combined with the rotating machine to obtain direct current.

It is known that the use of alternators in motor cars has become generally established to the detriment of dynamos because alternators adapt more readily to variations in the speed of the engines driving them.

In fact, when the vehicle engine is idling, if the electric generator driven by the engine is to supply current, it is necessary for this generator to be driven at a higher speed than the idling speed. Provision is therefore made, between the vehicle engine and the electric generator, for transmission means which introduce a step up ratio which is currently of the order of 2 or 2.2 or slightly higher.

However, the introduction of this step up ratio creates difficulties when the vehicle engine is turning at its maximum speed because then the electric generator may be driven at excessive speeds. By way of a numerical non-restrictive example, if the maximum speed of the vehicle engine is of the order of 6,000 r.p.m, the electric generator then comes to be driven at a speed of the order of 12,000 r.p.m for a transmission ratio of 2.

Such a speed of rotation is no longer reasonably compatible with collector and brush machines (dynamos) but is, on the other hand, relatively well sustained by alternators which are provided with smooth slip rings.

There nevertheless remains the fact that high speeds of rotation to which the electric generators are subjected when the engine is operating at its maximum speed do constitute a difficulty because of the step up ratio, and all the more so because of the tendency towards increasing the step up ratio for the electric rotating machine to supply sufficient current when the engine is idling.

It should be recalled that the electromotive force (e.m.f.) of an alternator is approximately proportional to its speed of rotation.

Since the alternator should deliver current at the idling speed, it is necessary for this alternator to generate a peak voltage at the idling speed which is at least equal to, and preferably higher than, the voltage of the battery for the said alternator to be already capable of supplying an appreciable current, in particular in order to recharge the battery. By way of a numerical non-restrictive example, intended to to set out the ideas, starting with a vehicle supply network and a battery whose voltage is 14 volts, with an idling speed of approximately 600 r.p.m., the alternator will turn, in the case of a step up ratio equal to 2, at a speed of approximately 1,200 r.p.m; for the alternator to be already capable of supplying an appreciable current of the order of 5A to 10A at this speed of rotation, it will be necessary for the phase peak voltage of the alternator to be of the order of 20 volts with no load, if the battery is not connected. In these circumstances, at full engine speed, that is to say, approximately 6,000 r.p.m., i.e. 12,000 r.p.m. for the alternator, the electromotive force of this latter attains a relatively high value of the order of approximately 200 volts entailing considerable delivered current and which may necessitate relatively expensive electronic components.

In the case, which nowadays is frequent, of alternators with excitation currents, this electromotive force can be modulated and be reduced at full engine speed, by reducing the excitation current supplied to the inductor of the alternator, that is to say, to the rotor.

If the demand for current is high, the excitation current can be brought to the maximum value since the high electromotive force makes it possible to deliver high currents.

If there is a low demand for current, the excitation current, and hence the electromotive force as well as the current delivered by the alternator, are reduced.

However, in the case of alternators with permanent magnets (an inductor constituted by such magnets), it is not possible to modulate the excitation of the alternator. Since it is desired that the delivered current should not always be at its maximum, one is led to reduce the strength of this current by chopping, in particularl by means of a separate chopper device placed in series with the alternator and the rectifier bridge.

But with permanent magnet alternators, although the current chopping allows the current strength delivered by the alternator to be limited, the voltage problems remain because the excitation of the alternator ensured by the permanent magnets remains at its maximum value.

It is therefore apparent that the need for causing the alternator to turn relatively fast when the engine is idling to allow it to deliver an adequate current strength, creates serious difficulties regarding the electric and electronic components, and in the operating regime when the engine is turning at full speed, irrespective of the alternator type. This can also be the case of rotary electric machines of the dynamo type.

The object of the invention is in particular to provide an electric power supply unit for a motor vehicle comprising a rotating electric generating machine which no longer has the drawbacks set out above, or has them only to a lesser degree.

For reasons of energy saving, it is, moreover, known to instal in vehicles travelling frequently in town so-called "stop-go" systems which make it possible to stop the internal combustion engine each time the vehicle is stationary, for instance, at traffic lights or in a traffic jam, and to restart the internal combustion engine automatically when the driver again presses on the accelerator pedal.

For such an application, it is not reasonable to envisage the use of a conventional vehicle starter. Such a starter is highly powered to cope with difficult cold starts with repeated use. However, many stops of the vehicle in town traffic would, on the one hand, lead to excessive electric current consumption whilst the starting of a hot engine is normally easy, and on the other hand would lead to a considerable reduction of the starter's life.

Thought has therefore been given to using a flywheel for setting the petrol engine into motion again and for restarting it in such a "stop-start" system; the continuing rotation of the flywheel when the internal combustion engine has been stopped can be ensured by the rotating electric generating machine then used as an electric motor. In the case of an alternator, the rectifier bridge of the alternator is fitted out additionally with control elements making it possible to ensure the function of the motor for creating a rotating field in the stator according to the technique of motors termed "electronic switching" motors.

When the rotating electric machine, in particular the alternator, is used as the electric motor in such a "stop-go" system, the electrical energy for functioning as a motor is supplied by the battery of the vehicle. To enable the alternator operating as an electric motor to turn at a sufficient speed, it is necessary for the back emf of the electric motor to be substantially lower than the battery voltage, for the desired speed of rotation.

Now the electromotive force of the alternator, or more generally of the rotary electric machine operating as an electric motor, has an absolute value equal to that of the electromotive force of the alternator or of the machine operating as current generator.

In the case of a "stop-start" system one is confronted with a difficulty related to the one set out above with reference to the operation of the alternator when the internal combustion engine is idling.

In point of fact, although the emf of the alternator operating as generator is sufficiently powerful when the internal combustion engine is idling, the back emf of the alternator operating as the electric motor will become an obstacle to the supply of the current coming from the battery and it will not be possible to cause this electric motor to turn sufficiently fast from the normal voltge of the vehicle supply network and from the battery. It will possibly be necessary to raise this voltage by a converter which entails additional costs and complicates the installation.

To specify these difficulties in the case of a "stop-start" system, the following non-restrictive numerical examples may be given.

A "stop-start" system sacrifices the recharging of the battery when idling; in practice the following operation is adopted with a step up ratio of 2.2 for the speed of rotation of the electric machine in relation to that of the vehicle engine: release by disengagement of the flywheel intended to restart the vehicle engine from that keyed on the crankshaft below 2000 r.p.m. as far as the engine is concerned (4400 r.p.m. at the level of the alternator), as well as in the presence of any deceleration, even at higher speeds of the vehicle engine;

if the speed of rotation of the flywheel falls below 1800 r.p.m., the flywheel is reboosted up to 2,200 r.p.m. by causing the alternator to operate as an electric motor. The flywheel-alternator connection may be permanent or releasable but in any case, where the flywheel is in the energy supplying imode the alternator does not provide any current to the electric installation of the vehicle; during stops of the vehicle, the voltage of the battery is checked; if this voltage is too low, the vehicle engine is restarted to recharge the battery with the alternator. The same procedure is adopted if heavy consumers of electric energy are placed into operation.

It will be seen that the "stop-start" system compounds the problem of choosing the value of the electromotive force of the alternator or more generally of the rotating electric generating machine, already attained at the idling speed of the vehicle engine, and of the proportionality of this electromotive force in relation to the speed of rotation. With an alternator whose electromotive force is adequate at the idling speed of the engine (approximately 600 r.p.m.) to ensure the charging of a 14 volt battery, it will be necessary to have available a voltage of approximately 60 volts to cause the alternator to rotate (operating as a motor) at the speed of the order of 4,000 r.p.m. corresponding substantially to the r.p.m. of 2,000 desired for the flywheel intended to restart the engine.

The object of the invention is also to supply an electric power supply unit for a motor vehicle comprising a rotary electric generating machine, in particular, an alternator which would make it possible in the case where the generator would be used as an electric motor, to cause this electric motor to turn at a sufficient speed by means of the battery voltage without necessitating any voltage boosting circuit.

In accordance with the invention, an electric power supply unit for a motor vehicle of the kind defined above is characterised in that the electric machine is chosen in such a way that when it is driven by the engine at its idling speed, the voltage at the terminals of the rotary electric machine is insufficient to charge the battery, and in that it comprises means for making it possible to establish periodically a voltage surge at the terminals of the rotating electric machine, and a battery charging current. Generally, this machien is constituted by an alternator.

The invention therefore consists in rendering the rotary electric machine capable of supplying current to the battery, even if the electromotive force is below the voltage of the battery and of the power supply network of the vehicle.

Thus a machine may be chosen, in particular an alternator, apparently with an insufficient voltage when it is driven at the idling speed of the vehicle engine; as a result: as regards the operation as an ordinary alternator, the electromotive force at high speeds of rotation corresponding to the full speed of the vehicle engine will be reduced and will be that much less of an impediment especially if one is concerned with an alternator with permanent magnets; in the case of a "stop-start" system introducing a reversible alternator-motor operation, the alternator can be turned into an electric motor from the voltge of the vehicle power supply network at a sufficient speed without being impeded by an excessive back e.m.f.

Preferably, the means for allowing a voltage surge to be established at the alternator terminals and for supplying a current towards the battery comprise controlled switches disposed on one side of the rectifier bridge and control means for causing these switches to open contact in particular when the engine is idling, so as to generate the voltage surge at the terminals at successive windings of the alternator.

For producing the voltage surge, the switches are advantageously actuated in parallel.

These switches can be constituted by semiconductors, and in particular MOS transistors.

The chopping frequency will be determined in relation to the windings of the machine; as in the case of chopped power supplies, it is advantageous for it to be as high as possible. This chopping frequency is chosen to exceed the frequency of the waves generated by the machine, in particular of the order of 8 KHz or more.

The electric power supply unit may comprise means allowing the current square waves delivered by successive phase windings of the alternator to overlap with a view to automatically smoothign the current supplied to the battery and/or the vehicle supply network.

To obtain such smoothing by overlapping of the current square waves, provision is advantageously made in the electric power supply unit for an alternator with four phase windings in a star connection.

The invention also concerns a rotary electric machine for the electric power supply unit as defined above.

Apart from the arangements set out above, the invention consists of a certain number of other arrangements which will be discussed in greater detail below with regard to particular modes of embodiment described with reference to the attached drawings, but which are in no way restrictive.

Figure 1:
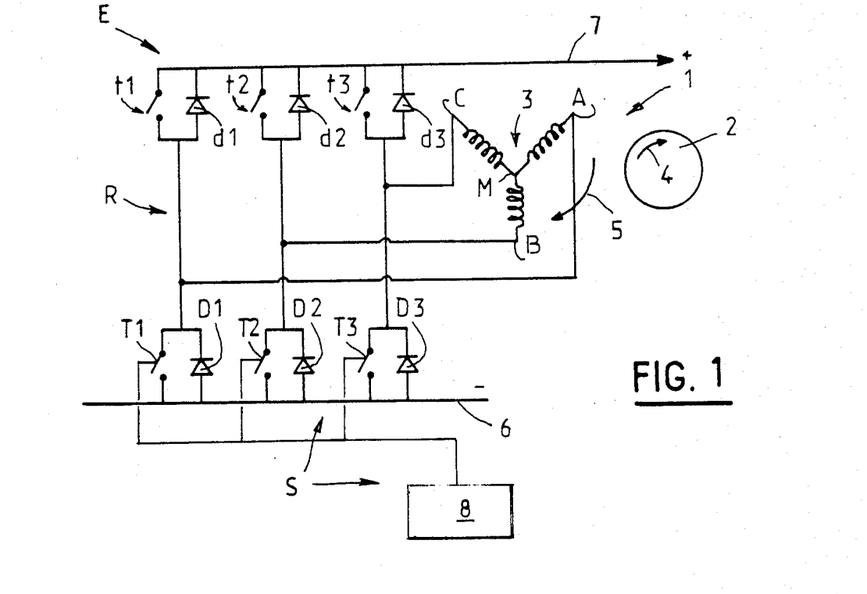
FIG. 1 of these drawings is a circuit diagram of a electric power supply unit in accordance with the invention, comprising a three phase alternator.

Referring to FIG. 1 of the drawings, an electric power supply unit E may be seen for a motor vehicle, this unit comprising an alternator 1 intended to be driven by the engine of the vehicle so as to supply electrical energy to a battery (not shown) and/or to various user units, (not shown). The alternator 1 comprises an inductor 2, constituting the rotor, and a stator 3 with several windings. In the example of FIG. 1, the alternator 1 is of the three phase type and its stator comprises three windings in a star connection. The terminals of these three phase windings are designated by the letters A, B, and C, whilst their common point is designated by M.

The rotor 2 of the alternator is driven from the vehicle engine by means of transmission means introducing a step up ratio, for example of the order of two, to enable the rotor to turn at a sufficient speed when the vehicle engine is idling. The rotor 2 may be of the coiled type and with an excitation current which can be modulated as required, in particular by a regulator. According to another possibility the rotor 2 can be of the permanent magnet type. The direction of rotation of the rotor 2 according to the circuit diagram of FIG. 1 is the clockwise direction indicated by arrow 4.

The rotation of the rotor 2 induces alternating sinusoidal voltages in the widings of stator 3 dephased by 120°. The phase succession is, in accordance with the circuit diagram, assumed to take place in a clockwise direction, represented by arrow 5.

The unit E comprises a rectifier bridge R capable of establishing direct current from the alternating current coming from the alternator 1. This rectifier bridge comprises 6 diodes in a conventional manner, that is to say, two diodes associated with each winding of the stator 3; thus with the winding admitting to terminal A, there are associated the two diodes D1 and d1. The anode of the diode D1 is connected to the electric line 6 connected to the -terminal of the battery whilst the cathode of D1 is connected to the terminal A as well as to the anode of the diode d1. The cathode of the diode d1 is connected to an electric line 7 connected to the + terminal of the battery.

Similarly, the diodes D2, d2 and D3, d3 are linked with the terminals B and C.

In accordance with the invention, the alternator 1 is chosen in such a way that when it is driven by the vehicle engine at its idling speed, the phase voltage at the terminals of the alternator 1 is insufficient for charging the battery. In practice, the peak phase voltage when idling lies below the battery voltage; this voltage is frequently 14 volts in modern vehicles.

The unit E comprises, moreover, means S establishing a voltage surge, periodically at terminals A, B, C of the alternator, and also a battery charging current, in spite of the voltage of this alternator 1 which is normally insufficient when the engine is idling.

The means S comprise controlled switches T1, T2, T3 disposed on one side of the rectifier bridge, that is to say, on the side connected to the line 6 and control means 8, for causing the switches to go non-conductive repeatedly when the vehicle engine is idling so as to generate a voltage surge at the terminals A, B and C of the successive windings of the alternator.

The switches T1, T2, T3 are connected in parallel to the terminals of the respective diodes D1, D2, d3. These switches can be constituted by MOS transistors or any other semiconductor. It should be noted that in the circuit diagram of FIG. 1, the switch and the associated diode have been represented separately; in practice, if it is a MOS transistor, it can perform both the functions of switch and diode at one and the same time in such a way that a single electronic compoent, that is to say the transistor, is connected between the line 6 and the associated terminal of the alternator.

The control means 8 are constituted by a signal generator whose output is connected to the grid of each MOS transistor T1, T2, T3. These transistors or switches are actuated in parallel, that is to say, they are closed or opened simultaneously. The electrode constituting the drain of each transistor is connected to the associated terminal of the alternator, whilst the other electrode constituting the source is connected to the line 6.

In the case where the alternator 1 is intended to operate solely as an electric current generator, the diodes d1, d2, d3 are used on their own.

On the other hand, in the case where the alternator 1 is intended to be reversible so as to be capable of functioning as an electric motor controlled switches also constituted by MOS transistors t1, t2, t3 are connected in parallel on the other side of the rectifier bridge to the terminals of the diodes d1, d2, d3. As with an electronic switching motor, it is possible by a judicious actuation of the switches T1, T2, T3 and t1, t2, t3, to produce a rotating magnetic field by means of the windings of the stator 3 which creates a couple driving the rotor. As explained above, one and the same MOS transistor can perform the function of switch t1 and of diode d1.

The chopping frequency actuated by the signals coming from means 8 is preferably high, of the order of 8KHz or more. The cyclic ratio can be equal to 50%, that is to say, that the duration of the intervals during which the transistors T1, T2, T3 are conductive, is equal to the duration of the intervals during which these same transistors are blocked (switches open). Depending on the machines, other cyclic ratio values can be used. This cyclic ratio can even vary with the speed to make it possible to obtain an optimum efficiency.

Provision is advantageously made for control means 8 to interrupt the chopping and keep the transistors T1, T2, T3 open, that is to say blocked, when the speed of rotation of the engine of the vehicle attains such a value that the voltage produced by the alternator 1 comes to be sufficient for supplying the battery in the normal way.

There will now be considered the case of an alternator with permanent magnets. Such an alternator can have, partly due to the appearance of new types of very powerful magnets, higher performance data than those of a machine based on excitation, of the same size.

The problem of regulation is not easy by electrical means because the flux produced by the permanent magnets is always at its maximum. The electronic circuits for controlling the current can only be on the power circuit itself controlling the currents delivered by the alternator, and with the no load voltages generated by the machine.

The present invention makes it possible to facilitate the resolution of this problem by a compromise.

At low speeds, one will therefore improve, by chopping, the performance of a machine which will therefore still have been chosen to have a low voltage capacity.

At moderate and high speeds, one will proceed with another chopping of the current delivered with a storage inductance coil L (FIG. 4) and a free wheel diode F (FIG. 4) in accordance with a known technique. It should be noted that this inductance coil ensures the smoothing of the low speed chopped currents.

Figure 4:
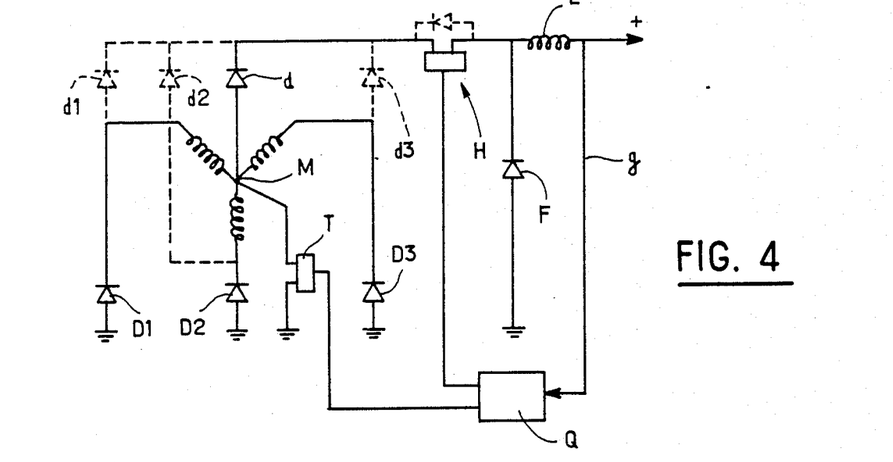
FIG. 4 is a circuit diagram of a layout intended for a three phase alternator with an inductor fitted with permanent magnets.

One may therefore have the circuit diagram of FIG. 4 for a three phase alternator by way of a non-restrictive indication. The chopping at low speed is ensured by a single switch T connected between the centre point M and earth, this switch being controlled by a unit incorporated in the regulator Q. For rectifying a single alternation, only point M is connected to the positive line by means of a diode d. The anode of the diode is connected to the point M whilst the cathode is connected to the positive line. For a full wave rectification, one would use the diodes d1, d2, d3 represented in dotted lines and similar to those of FIG. 1; the diode d would then be suppressed. In all cases, one uses diodes D1, D2, D3 similar to those of FIG. 1 and connected in the same manner.

The chopping at the moderate and high speeds is ensured by a chopper H mounted in series on the positive line and controlled by the regulator Q. The storage inductance coil L is connected in series downline fom the chopper H, whilst the freewheel diode F is connected by its cathode to a point situated between the inductance coil L and the chopper H, and by its anode to earth.

The voltage downline from the inductance coil L is returned to the regulator Q by a line g.

The operation of the unit E of FIG. 1 is as follows:

For low speeds of rotation of the vehicle engine, in particular when this engine is idling, the sinusoidal electromotive forces generted by the alternator 1, do exist, although they are too weak to cause a battery charging current to circulate through the rectifier diodes and they can cause a current to circulate through the transistors T1, T2, T3 when the latter are conductive.

It will be recalled that the transistors are switched at a relatively high frequency by the means 8.

When the transistors T1, T2, T3 are conductive, they establish a short circuit in the corresponding windings of the stator 3. The appearance of an electromotive force, although weak, at the terminals of these windings generates a short circuit current in the windings which constitute inductance coils. When the switching is cut, as a result of the blocking of transistors T1, T2, T3, a voltage arises in the windings and causes the diodes d1, d2, d3 to become conductive. The electrical energy stored in the windings flows out to the battery in the form of a charging current.

The transistors T1, T2, T3 successively perform a chopping function as the voltage grows on the terminals A, B and C of the stator 3. Moreover, the reverse diodes D1, D2, D3 ensure, conduction, as far the other end of the winding or windings is concerned.

Figure 2:
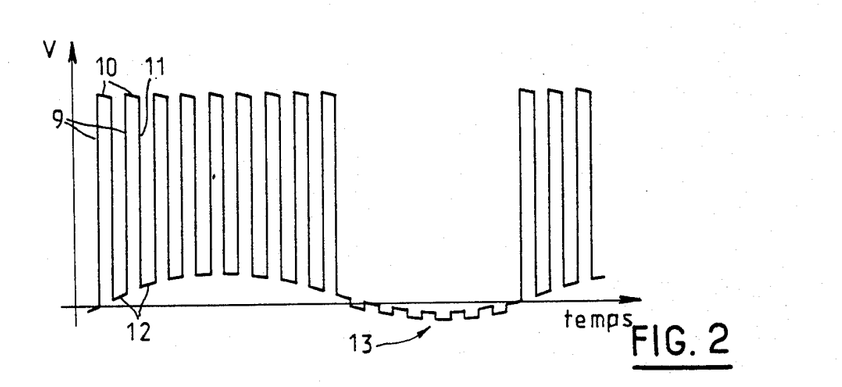
FIG. 2 represents the voltage signal, plotted along the y axis, in relation to the time base plotted along the x axis, which can be observed at the terminals of one phase of the alternator when the vehicle engine driving the alternator is idling.

FIG. 2 illustrates the voltage at one terminal of one of the windings of the stator 3. For each positive alternation of the sinusoidal wave on the terminal considered, the opening of the corresponding electric circuit produced by the blocking of the transistors generates a voltage surge corresponding to a rising front 9 of a square wave. This voltage square wave is clipped to a value slightly exceeding the battery voltage. The voltage slightly diminishes, which corresponds to the segment 10 of FIG. 2 during the open period of the transistor associated with the winding considered. When this transistor becomes conductive again, the voltage drops along the descending front 11 down to the value of the electromotive force of the alternator 1 corresponding tothe instantaneous speed of rotation. During the phase where the transistors are conductive, the starter winding considered stores energy which it will deliver to the battery during the next opening of the transistors; this storage stage corresponds to segments such as 12 in FIG. 2. For a cyclic ratio equal to 50% of the signals delivered by the means 8, the segments 10 and 12 correspond to the same period, that is to say, the same component along the x axis of FIG. 2 which is the time base axis.

During the negative alternation 13 wherein the terminal A, B or C considered is at a lower voltage than that of the centre point M, the chopping introduced by the transistors causes square waves of a low amplitude to appear as represented in FIG. 2, due to the conduction of the reverse diode.

For each terminal A, B or C, the voltage signal is the same as that of FIG. 2 with a time displacement corresponding to a rotation of 120° of the rotor 2 from one terminal to the other.

Figure 6:
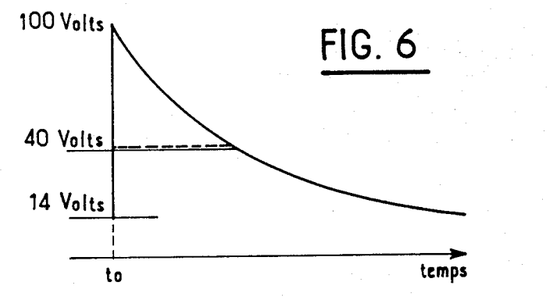
FIG. 6 is a diagram illustrating a voltage surge at the terminals of the alternator when a charge is suddenly disconnected.

It is known that when a load which alternators are supplying is suddenly disconnected, they generate a voltage surge for a fraction of a second, before they regain a fresh equilibrium; this voltage surge can attain about ten times the nominal voltage. This voltage surge is illustrated in the diagram of FIG. 6 where the time base has been plotted along the x axis whilst the voltage at the terminals of the alternator is plotted along the y axis. At time t0, a load which the alternator was supplying, is disconnected. The voltage at the terminals of the alternator can suddenly pass from the nominal value, for instance 14 volts to a value of the order of 100 volts. All the electrical or electronic equipment of the motor vehicle is liable to suffer from such a voltage surge which one will try to suppress at its source, that is to say, in the alternator itself.

This may be accomplished by means of a large Zener diode clipping the voltage surge, for instance to a value of the order of 40 volts, as illustrated by the dashed level in FIG. 6, which becomes acceptable for the other electrical and electronic equipment of the vehicle.

The diodes of the rectifier bridge R can themselves be Zener diodes and perform this function.

Figure 5:
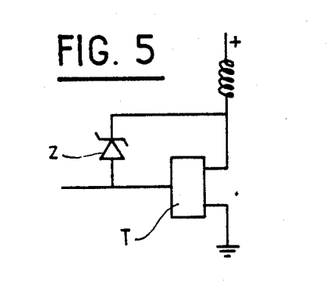
FIG. 5 is a circuit diagram of a connection detail for limiting the voltage surges.

In the case where transistors are used, in particular power MOS transistors provided for withstanding the maximum currents of the machine, they can be made to perform also the function of large Zener diodes by looping the transistor T, as represented in FIG. 5 with a small Zener diode z whose anode is connected to the grid of the transistor T, whilst the cathode is connected to the drain of this transistor.

Figure 3:
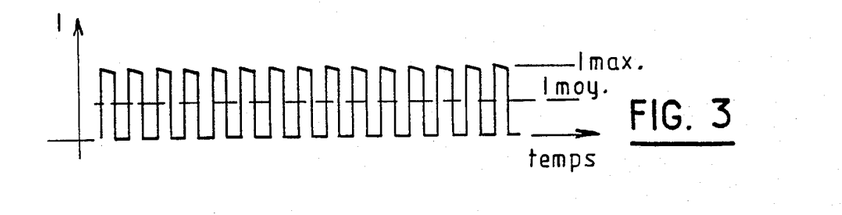
FIG. 3 is a diagram representing the current supplied to the battery by the alternator when the engine is idling.

FIG. 3 illustrates the battery charging current obtained with the unit E of the invention when the vehicle engine is idling and when the switch means T1, T2, T3 are in operation. The variations of the strength of the battery charging current plotted on the y axis with respect to time are represented by a square wave signal passing from a value of I max. to the value of zero in response to the voltage square wave of FIG. 2. In the case considered, of a cyclic ratio of 50%, the maximum strength I max. is equal to twice I average because the intervals during which the current is zero have the same duration as those during which the current is at the I max. value.

Figure 7:
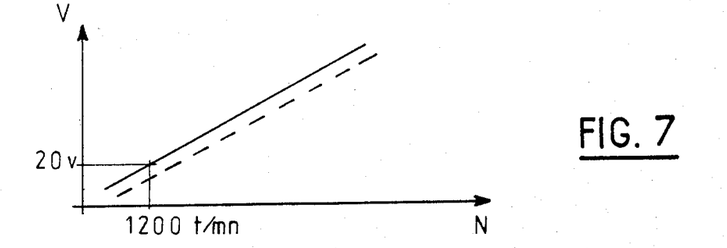
FIG. 7 is a diagram illustrating the variation of the electromotive force plotted along the y axis in relation to the speed of rotation in the case of a conventional alternator.

The diagram of FIG. 7 illustrates the variation of the electromotive force at the terminals of a conventional alternator with a solid line in relation to the speed of rotation N plotted along the x axis. The variation is represented by a section of a straight line, since the electromotive force is proportional to the speed of rotation. In a conventional set up for a 14 volt battery, the alternator is arranged so as to have at the idling speed of the alternator corresponding for instance to a speed of 1,200 r.p.m.. an electromotive force of 20 volts with no load. In a unit in accordance with the invention, the electromotive force of the alternator at the idling speed lies below that value; the graph representing the variation of the electromotive force of the alternator in a unit in accordance with the invention corresponds to the section of the straight line drawn in dashes in FIG. 7 situated below the section drawn in a solid line. The solution of the invention therefore makes it possible to reduce the electromotive force of the alternator when the engine is operating at full speed.

Figure 8:
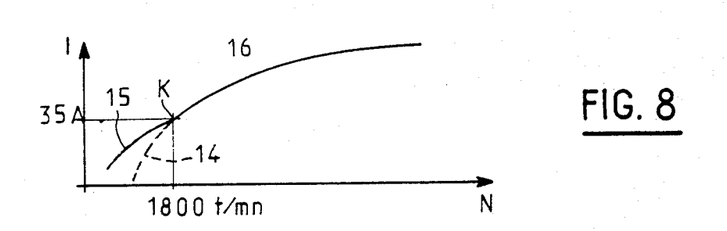
FIG. 8 is a diagram representing the variation of the current strength delivered by the alternator of the power supply unit in accordance with the invention in relation to the speed of rotation plotted along the x axis.

The diagram of FIG. 8 represents the variations of the current strength I plotted on the y axis, delivered by the alternator in relation to the speed of rotation N of this alternator. For low speeds of rotation of the alternator, for instance, speeds below a value of 1,800 r.p.m. in a conventional alternator, the strength delivered drops very rapidly as represented by the section of the curve 14 of FIG. 8.

On the other hand, in a unit E in accordance with the invention, the alternator continues to deliver a relatively high strength for speeds of rotation below 1,800 r.p.m., as represented by the section of the solid line curve 15 of FIG. 8. As from point K, that is to say, above 1,800 r.p.m., the conventional curve 16 will again near, corresponding to the usual operation of the alternator 1 of FIG. 1 without intervention of the switch means T1, T2, T3.

To reduce the number of chopping transistors and the number of diodes, one may be content with simplified solutions such as those illustrated by the circuit diagrams of FIGS. 9 to 12.

Figure 9:
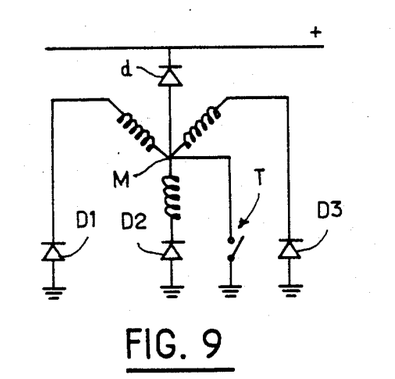
FIGS. 9 to 12 are circuit diagrams of other modes of embodiment possible with a three phase alternator.

FIG. 9 illustrates a half wave rectification for a three phase alternator whose three windings are represented. The circuit diagram of FIG. 9 practically corresponds to that of FIG. 4 and the same references are used to designate similar elements for those performing similar functions, without a repetition of their description.

Figure 10:
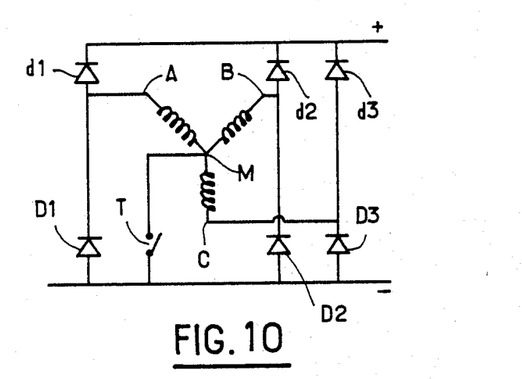

The circuit diagram of FIG. 10 corresponds to a full wave rectification with a rectifier bridge of six diodes, two diodes being associated with each winding of the three phase alternator. The diodes are designated by the same references as in FIG. 1. The three windings are in a star connection with a centre point M. Provision is made for a single switch T as in the case of FIG. 9, this interruptor being connected between the point M and the line connected to the −terminal or to earth.

Figure 11:
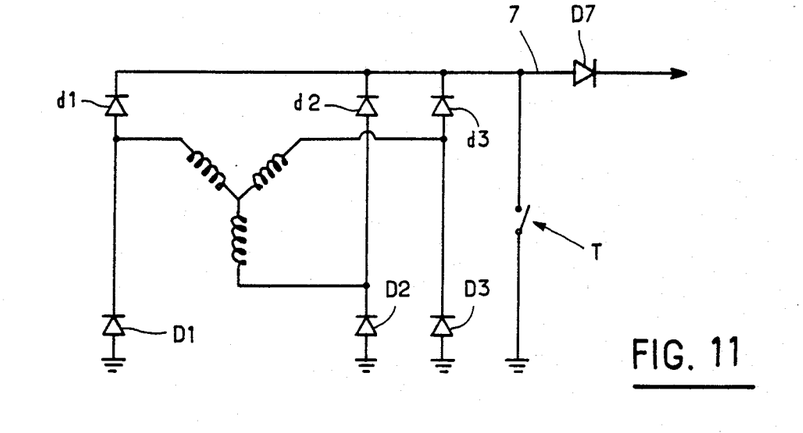

The circuit diagram of FIG. 11 corresponds for a three phase alternator to a full wave alternation with a rectifier bridge of six diodes. Provision is made for a single switch T between the line 7 connected to the positive terminal and earth. A diode D7 is mounted on the line 7 downline from the connecting line for the switch 1 the anode of this diode being connected to the output of the alternator, whilst the cathode is connected to the positive terminal of the battery, not shown.

The circuit diagram of FIG. 11 makes it possible to obtain a good efficiency for the machine (full wave rectification) with a single chopper; however, an additional drop occurs in the diode D7. To avoid this drawback, one may adopt the layout in accordance with the circuit diagram of FIG. 12.

Figure 12:
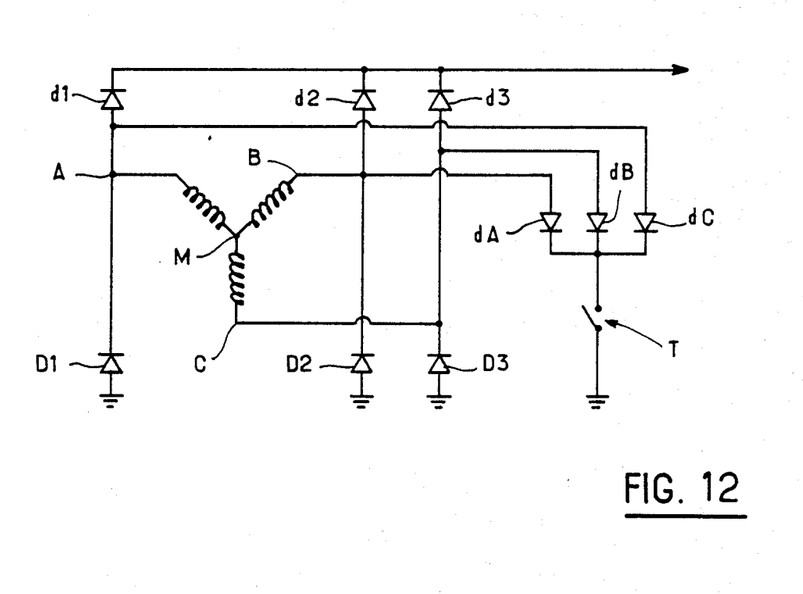

The three phase alternator whose stator windings are in a star connection, is associated with a rectifier bridge with six diodes as in the case of FIG. 11. Each end of one stator winding is connected to the anode of a corresponding diode dA, dB, dC. The cathodes of these three diodes are connected together. A single switch means T is connected between the common point of the cathodes and earth.

The circuit diagram of FIG. 12 makes it possible to avoid the voltage drop occurring in diode D7 of the circuit diagram of FIG. 11. Since diodes are less expensive components than transistors, the layout of FIG. 12 which relies on a relatively high number of diodes remains more economical than that of FIG. 1.

It should be noted that the circuit diagram described above are applicable not only in a star connection but also to a delta connection of the windings. These examples of circuit layouts presented on a three phase basis can be generally applied to other multiphase layouts.

Figure 13:
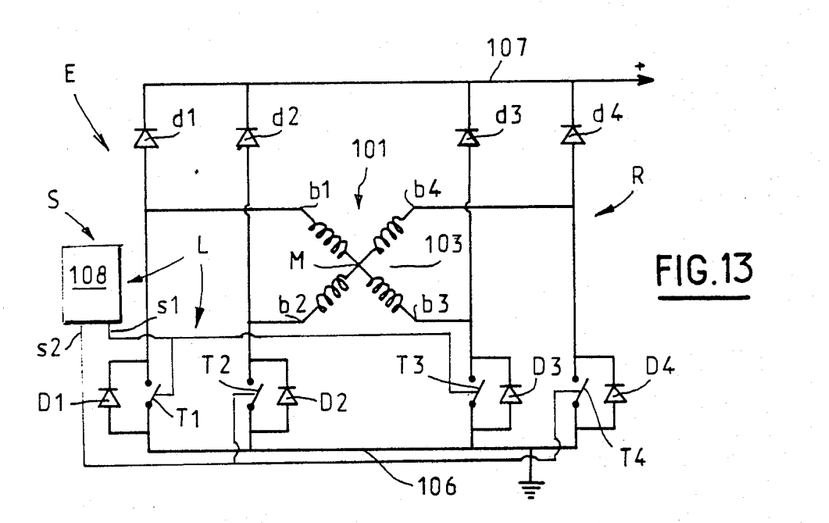
FIG. 13 is a circuit diagram of a variant of the embodiment of the power supply unit in accordance with the invention, comprising a four phase alternator in a star connection.

The circuit diagram of FIG. 13 illustrates a variant in which, the power supply unit E comprises means L allowing the current square waves which are delivered by successive windings of the phases of the alterator to overlap to obtain a smoothing of the battery charging current.

The alternator 101 of the unit E of FIG. 13 comprises four phase windings in a star connection. In FIG. 13, only the windings of the stator 103 have been represented without a repetition of the schematic outline of the rotor appearing in FIG. 1. The stator comprises four terminals b1, b2, b3, b4.

The rectifier bridge R consists of eight diodes, that is to say, D1 . . . D4 and d1 . . . d4.

The diodes D1 and d1 are associated with the terminal b1. The anode of the diode D1 is connected to the line 106 which is earthed by being connected to the negative terminal of the battery. The anode of this diode D1 is connected to the terminal b1. The anode of diode D1 is connected to the terminal b1 while the cathode of the diode d1 is connected to the line 107, which is itself connected to the positive terminal of the battery. The other diodes are associated in the same manner with the other terminals b2, b3, b4.

Controlled switches T1, T2, T3, T4 are connected in parallel to the terminals of the diodes D1 . . . D4. As in the case of the embodiment of FIG. 1, these switches are advantageously constituted by MOS transistors which can perform the function of the switch and of the diode at one and the same time, although these two elements have been shown separately in FIG. 13.

The means 108 for actuating the cutting of the circuit by the switches T1 . . . T4 comprise two outputs s1, s2 capable of delivering signals staggered in time as represented in FIG. 7. Preferably, these signals are formed by complementary square waves corresponding to a cyclic ratio of 50%, these square waves thus being staggered by a half period.

The signals coming from the output s1 control the switches T1, T3 in parallel which correspond to two opposed windings of the stator 103. The signals coming from the output s2 control the switches T2, T4 in parallel which are associated with the two other opposed windings of the stator 103.

As in the case of the embodiment of FIG. 1, the switch means T1 . . . T4 are actuated at high frequencies, in particular of 8 KHz or more, when the vehicle engine is idling so as to produce the voltage surges to ensure the charging of the battery from the alternator 101 which has been chosen in such a way that its electromotive force should, under normal operation, be insufficient at the idling speed to ensure such charging.

Figure 15:
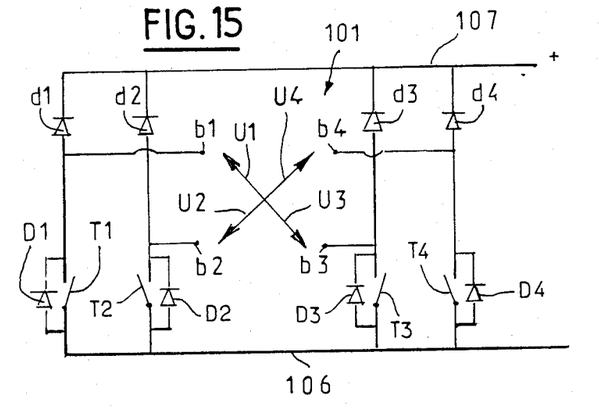
FIG. 15 is a simplified circuit diagram intended to show the essentials of the voltages in the power supply unit of FIG. 13.

FIG. 15 partly repeats the circuit diagram of FIG. 13, but without showing the four stator windings connected in the same way as in FIG. 13 and with a minimum of reference numerals or letters.

This FIG. 15 illustrates the voltages generated at the terminals of the stator by the vectors U1, U2, U3 and U4.

In accordance with the normal operation of rectifier bridges and taking into account the disposition of the vectors represented in FIG. 15, the diodes D2 and D3 will be conductive when the voltage surges produced by T1 or T4 make the diodes d1 and d4 conductive.

Figure 16:
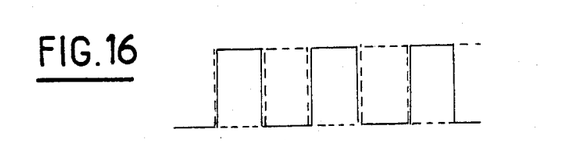
FIG. 16 is a diagram illustrating the overlapping of the current square waves produced by the unit of FIG. 13.

If care has been taken to overlap the voltage surges of T1 and T4 at 50%, one will obtain the current represented in FIG. 16. The current produced by the voltage surge of b1 is shown in a solid line whilst that produced by the voltage surge of b4 is shown in dashes.

It will be seen that the average strength of the current supplied to the battery is substantially constant and equal to the maximum current strength of a square wave supplied by a pair of two opposed windings of the alternator 101.

Figures 17, 18:
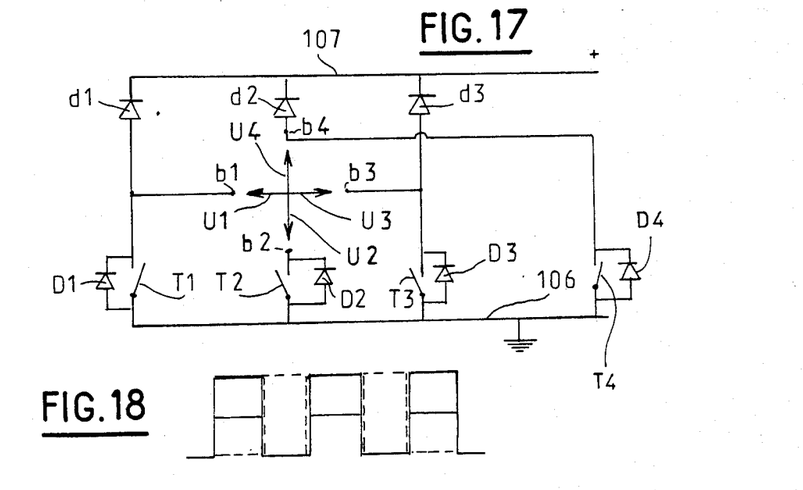
FIG. 17 is a simplified circuit diagram, similar to that of FIG. 15 corresponding to another situation of the instantaneous values of the four phase of the alternator.
FIG. 18 illustrates the overlapping of the current square waves obtained in the case of FIG. 17.

When the rotor is turning, the vectors U1...U4 turn and a little later, one has the situation of FIG. 17.

Figure 19:
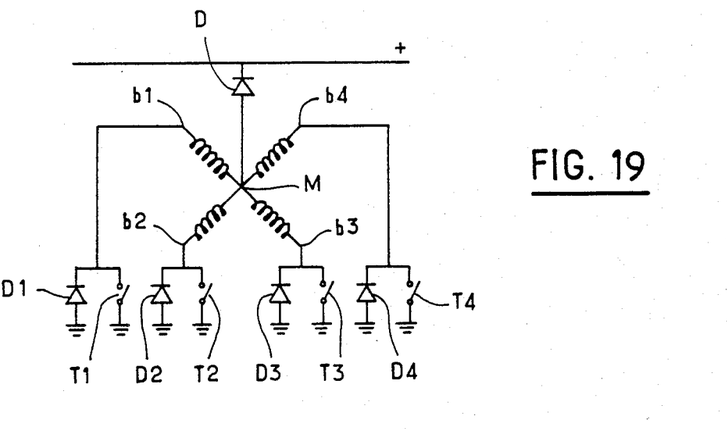
FIGS. 19 and 20 are circuit diagrams of other modes of embodiment possible with a tetra-phase alternator.

The diode D2 is conductive, T1 and T3, actuated simultaneously produce a voltage surge at b1 and b3 accounting for half of the current represented in a solid line in the form of two square waves superposed in FIG. 19; whilst T4 (at b4) which therefore benefits from a higher voltage (from U4), creates on its own a current which is equivalent to the two other added currents and overlaps with them.

To sum up, T1, T3 are actuated with one switching phase and T2 T4 with the complementary phase.

Figure 14:
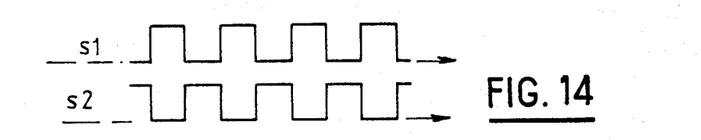
FIG. 14 is diagram of the control signals for the switches, of two groups of opposed phases, of the alternator of the unit of FIG. 13.

FIG. 19 is a circuit diagram, illustrating a variant of the layout of a tetraphase alternator. Here again there are the diodes D1 . . . D4 and the switches T1 . . . T4 of FIG. 13. On the other hand, the diodes d1 . . . d4 of FIG. 14 are replaced by a single diode D whose anoder is connected to the centre point M, and the cathode to the positive line.

Figure 20:
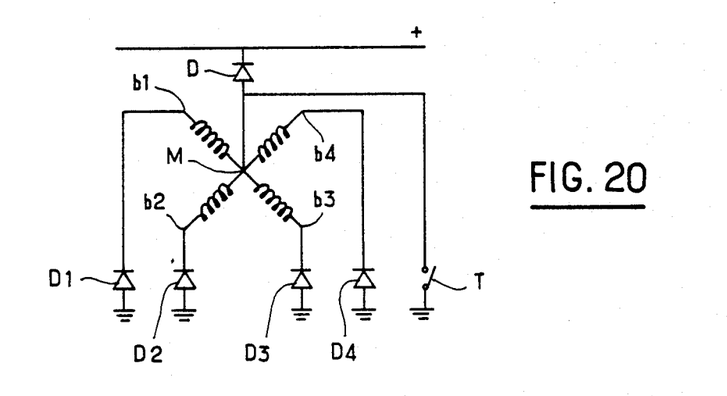

FIG. 20 is a circuit diagram illustrating another variant of the layout of a tetraphase alternator. The switches T1 . . . T4 of FIG. 13 are replaced by a single switch T connected between the centre point M and earth. Here again there is the diode D of FIG. 19.

To sum up, the electric power supply unit in accordance with the invention makes it possible to cause an alternator to deliver current even at a very low speed of rotation, while the electromotive force of the alternator can be below the voltage to be supplied. As a result, such a power supply unit makes it possible to reduce the voltages generated by the alternaotr at a very high speed of rotation.

The solution of the invention makes it possible, by taking a low voltage machine, to reconcile the requirements of a reversible alternator - motor operation for speeds which overlap.

The invention allows the power to weight ratio of alternators to be improved.

In fact, the alternator in a motor vehicle is designed to ensure a certain current output under the usual or even difficult conditions of use of the vehicle.

As already described, the case of idling or of low speeds for driving in town, especially in winter (heating, rear window, etc.) and at night (lights, dipped lights, etc.), corresponds to the most difficult case.

This leads to overdimensioning of the alternator.

Since the present invention considerably reinforces the efficiency in this field of use, it should make it possible to revert to a smaller machine.

The reversible machine has been described within the sphere of the stop-start system which allows the problem to be dealt with by means of a flywheel.

But thought may also be given to a solution where the alternator, momentarily transformed into a motor, could generate a couple which would be sufficient to restart the internal combustion engine without the help of inertia. The couple must then be clearly more powerful but the speeds of rotation to be attained with the engine are lower. In fact, the compatibility problem of the back e.m.f. disappears in that case. The engine range extends from 0 to 1,000 r.p.m. and the alternator range extends from 1,200 to 12,000 r.p.m; they therefore do not overlap. But since the couple is proportional to the current entering the internal combustion engine, this current will be higher for the speeds necessary for the starting of the engine (about 200,300 r.p.m., that is to say 400, 600 r.p.m. for the electric machine), the lower the back e.m.f.s.

This therefore leads to a low voltage machine which will be revalued as alternator at the "idling speeds" by the chopping system of the invention.

Other spheres of application of the invention include dynamos.

At the outset of the description, it has been explained why alternators have supplanted dynamos in cars.

There nevertheless remains the fact that dynamos also had certain advantages, in particular those of a far easier connection to the battery, whether as generator or as motor.

To revert to the stop-start system, it will be seen that the dynamo resolves this problem more readily because as a motor, it suffices to connect it to the battery whilst the alternator requires an electronic switching circuit; a chopping system as described in the invention with a single transistor raises the performance at low speeds which was precisely one of the defects of dynamos in the car.

Figure 21:
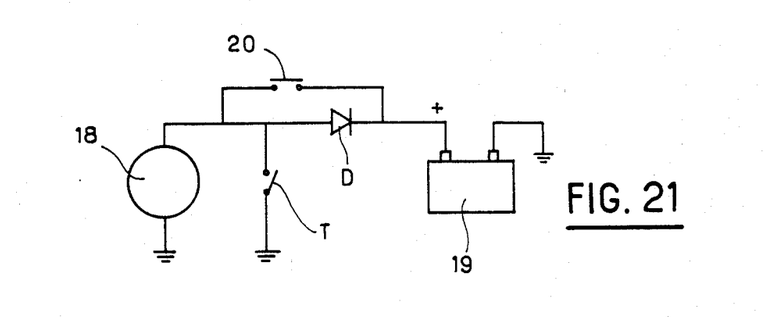
FIG. 21 finally, is a circuit diagram of a power supply unit comprising a dynamo as the rotating electric machine.

FIG. 21 is a circuit diagram of a power supply unit in accordance with the invention comprising a dynamo 18 whose one terminal is earthed and the other terminal is connected by a diode D to the positive terminal of the battery 19. The anode of the diode D is connected to the terminal of the dynamo 18 whilst the cathode of the diode D is connected to the battery. A switch or chopper means T is connected between, on the one hand, the output terminal of the dynamo 18 (and hence the anode of diode D) and, on the other hand, earth; the switch means T intervenes at low speeds of rotation as explained above.

A contact 20 is mounted in parallel between the output terminal of the dynamo 18 and the positive terminal of the battery 19. This contact 20 is closed so as to shunt the diode D when one wishes to cause the dynamo to work as motor.

In the case of a dynamo, it may be considered that the means for rectifying the current are formed by the set of the collector and brushes.

Uses of the invention, other than in automobiles, are possible.

The principles of this invention which lie in improving by means of chopping, the low speed performances of rotating generating machines for a constant output voltage (load, battery), can be applied to all the cases where considerable variations of speed are inevitable.

The uses include (a) windmills where it becomes possible to recharge the batteries even with light winds and (b) in general, charging systems based on screws or similar, moved by fluids according to a rate of displacement: sailing boats for instance.

We claim:

1. In an electric power supply unit comprising:
   (a) a rotary electric machine intended to be driven by a prime mover so as to supply electrical energy to at least one of a battery and various user units; and
   (b) rectifier means combined with the rotary machine to establish direct current;
   (c) the rotary electric machine is designed such that when it is driven at idling speed, the phase voltage at the terminals of the rotary electric machine is insufficient to charge the battery; and wherein:
   (d) said rotary machine comprises means to establish periodically a voltage surge at the terminals of the rotary electric machine and to generate a current for charging the battery;
   wherein said rectifier means comprises a rectifier bridge having first and second sides, wherein the rotary electric machine is an alternator, and wherein the means for establishing a voltage surge at the terminals of the alternator and for causing a current to be delivered to the battery comprise:
   (i) controlled switches disposed on the first side of the rectifier bridge, and
   (ii) control means for controlling said switches to cut the current at the idling speed so as to generate the voltage surge at the terminals of successive windings of the alternator.

2. An electric power supply unit according to claim 1, including means for actuating said controlled switches in parallel.

3. An electric power supply unit according to claim 1, wherein said switches are constituted by semi-conductors.

4. An electric power supply according to claim 4, wherein said switches are MOS transistors.

5. An electric power supply unit according to claim 1, wherein the frequency of the cuts established by the control means exceeds the frequency of the voltage waveform generated by the machine.

6. An electric power supply according to claim 5, wherein said frequency of the cuts is at least 8 KHz.

7. An electric power supply unit according to claim 1, wherein the control means are provided to interrupt the chopping when the speed of rotation of the engine attains such a value that it is preferable to re-establish the normal operation using ordinary diodes.

8. An electric power supply unit according to claim 1, comprising controlled switches connected to the second side of the rectifier bridge wherein the alternator is capable of operating as an electric motor by a judicious control of the switches.

9. In an electric power supply unit comprising:
   (a) a rotary electric machine intended to be driven by a prime mover so as to supply electrical energy to at least one of a battery and various user units; and
   (b) rectifier means combined with the rotary machine to establish direct current; the improvement wherein:
   (c) the rotary electric machine is designed such that when it is driven at idling speed, the phase voltage at the terminals of the rotary electric machine is insufficient to charge the battery; and wherein:

(d) said rotary machine comprises means to establish periodically a voltage surge at the terminals of the rotary electric machine and to generate a current for charging the battery, wherein said rotary electric machine is an alternator having successive phase windings for producing current square waves and said unit comprises means making it possible to overlap said current square waves delivered by said successive phase windings of said alternator in order to obtain automatically a smoothing of the charging current supplied to at least one of the batteries and a vehicle network.

10. An electric power supply unit according to claim 9, wherein said electric machine comprises an alternator with four phase windings disposed in a star connection.

11. An electric power supply unit as claimed in claim 10 wherein opposed windings of said alternator form two pairs, and said unit includes means for cutting the current in thee windings of each pair, said means for cutting the current being effective to operate simultaneously.

12. An electric rotary machine for an electric power supply unit according to any one of the preceding claims, having its e.m.f., when driven at an idling speed, lower than the voltage of said battery.

13. An electric rotary machine according to claim 12, when in the form of an alternator.

* * * * *